(12) United States Patent
Curry et al.

(10) Patent No.: US 7,086,445 B2
(45) Date of Patent: Aug. 8, 2006

(54) COVER FOR AN ELONGATE OPENING

(76) Inventors: Walter John Curry, 337 Roberta Avenue, Winnipeg, Manitoba (CA) R2K 0K5; Michael Francis Curry, 21 Treger Bay, Winnipeg, Manitoba (CA) R2K 3G4

( * ) Notice: Subject to any disclaimer, the term of this patent is extended or adjusted under 35 U.S.C. 154(b) by 385 days.

(21) Appl. No.: 10/729,367

(22) Filed: Dec. 8, 2003

(65) Prior Publication Data
US 2005/0121150 A1    Jun. 9, 2005

(51) Int. Cl.
*A47G 5/02* (2006.01)
(52) U.S. Cl. .................. 160/243; 160/352; 52/66; 241/101.742; 405/129.9
(58) Field of Classification Search .............. 160/242, 160/243, 246, 352, 264, 267.1, 271, 273.1, 160/277, 272, 120, 122; 296/100.18, 100.12; 4/502; 52/66, 749.12; 405/129.9, 129.6; 241/101.742; 210/923
See application file for complete search history.

(56) References Cited

U.S. PATENT DOCUMENTS

| | | | | |
|---|---|---|---|---|
| 277,760 A | * | 5/1883 | Mallory | ................ 160/267.1 |
| 1,943,371 A | * | 1/1934 | Cross | .................. 160/133 |
| 2,049,471 A | * | 8/1936 | Reilly | .................. 160/122 |
| 2,811,201 A | * | 10/1957 | Reid, Jr. | .................. 160/122 |
| 4,192,105 A | * | 3/1980 | Morgan | .................. 52/2.25 |
| 4,195,370 A | * | 4/1980 | Budd | .................. 4/502 |
| 4,464,801 A | * | 8/1984 | Lamb | .................. 4/502 |
| 4,909,563 A | * | 3/1990 | Smith | .................. 296/98 |
| 5,725,173 A | * | 3/1998 | Yasnogorodskiy et al. | ........ 242/396.1 |
| 6,546,990 B1 | * | 4/2003 | Peeters | ............. 160/370.22 |
| 2004/0133972 A1 | * | 7/2004 | Ragsdale et al. | ............. 4/502 |

* cited by examiner

*Primary Examiner*—Blair M. Johnson
(74) *Attorney, Agent, or Firm*—Adrian D. Battison; Michael R. Williams; Ryan W. Dupuis

(57) ABSTRACT

Waste materials are composted in an elongate pit which is maintained covered to retain odors. The pit includes two rails each arranged along a respective side of the opening for receiving operating machines and a carriage for supplying a covering sheet. Each side edge of the sheet has attached thereto a channel shaped support member arranged for engaging over the respective rail so as to attach the side edge to the rail. A reel is mounted on the carriage and is arranged to roll the sheet and the two support members onto the reel and to un-roll the sheet and the two support members therefrom for deployment. An arch support bridges the support members and can flex to a flat condition from rolling on the reel. The carriage includes guides for moving the support members apart to a wider spacing for rolling on to the reel with the sheet flat and for guiding the support members onto the rails and for bowing the arch upwardly in the deployed position.

15 Claims, 7 Drawing Sheets

COVER FOR AN ELONGATE OPENING

This invention relates to a cover for an elongate opening such as a pit.

BACKGROUND OF THE INVENTION

One requirement which arises in a number of different contexts is that of covering an elongate opening using a cover which can be readily removed to allow access into the opening. One particular situation where this may occur and for which the present invention is primarily but not exclusively designed is that of a composting pit. Such a pit is generally wider than 10 feet allowing ready access to the pit for entry into the pit of vehicles and can be as much as 20 feet in width and is of a long length many times greater than the width.

Composting of materials is an effective and environmentally desirable technique for disposing of waste materials since the natural composting process breaks down any undesirable materials generally leaving a usable compost material.

However one significant problem which arises with composting methods of this type is that the composting action gives off noxious gases or at least foul smelling gases which are unacceptable to any surrounding persons in a residential or even a work environment.

It is being proposed therefore for such elongate pits to be covered by a series of doors which extend over the pit but can be opened and closed to allow access to the materials within the pits. It will be appreciated that the composting process requires that the material be mixed or agitated and that additional elements in some cases should be added including water and any necessary accelerators. The operation on the material within the pit is carried out by a machine or vehicle which runs along the pit on rails one on each side of the pit so that the machine bridges the pit and can operate below the rails within the material in the pit. The individual doors are then opened as the machine is moved forward and closed behind the machine thus maintaining the majority of the pit closed as the machine moves along the pit. However these doors are unsatisfactory in that they are difficult to seal and require extensive manual operation for the opening and closing action.

SUMMARY OF THE INVENTION

It is one object of the invention to provide an apparatus for covering an opening which is particularly but not exclusively proposed for and designed for a composting apparatus where a pit is maintained covered.

According to one aspect of the invention there is provided an apparatus for covering an elongate opening having two rails each arranged along a respective side of the opening, the apparatus comprising:

a sheet having a length to cover at least a part of the length of the opening and a width between two side edges to span the width between the rails;

each side edge of the sheet having therealong a respective support member arranged for engaging the respective rail so as to attach the side edge to the rail;

a carriage movable along the opening;

and a reel mounted on the carriage and arranged to roll the sheet and the two support members onto the reel and to un-roll the sheet and the two support members therefrom;

such that the sheet member can be unrolled from the reel by movement of the carriage longitudinally along the opening in one direction for deployment over the opening and can be rolled onto the reel by movement of the carriage longitudinally along the opening in an opposed direction for exposing the opening.

The term "sheet" as used herein is not intended to be limited to or to imply any particular material for the formation of the sheet and different materials can be used depending upon the characteristic of the opening to be covered. Where the opening is a composting pit, the sheet may be formed of an impermeable plastics material of a suitable thickness for maintaining gases and odors within the opening.

Preferably the carriage has wheels which are arranged to roll on the rails so as to use the same rails which are used to locate the sheet material but this is not essential and other rails may be used for the carriage and any other machine than are used for the location of the sheet.

Preferably the carriage has guides for deploying the sheet over the opening as it is unrolled from the reel.

Preferably the sheet is wider than the rails and the guides are arranged to direct the support members from a wider position maintaining the sheet flat on the reel inwardly to the width of the rails as the sheet is deployed. However in some designs the sheet may be tight over the opening so as to of the same width when rolled and when deployed.

In most cases the opening is relatively wide and thus there is provided a plurality of longitudinally spaced supports each bridging between the support members for supporting the sheet between the support members.

Preferably the supports are arch members having each end attached to a respective one of the support members.

Preferably each arch member is flexible so as to move from a flat condition on the reel to an arched position between the support members, thus requiring that the spacing between the supports on each side is less than the width of the sheet.

In this case, the carriage preferably has a guide member between the support members for lifting the arch members from the flat condition as each is deployed to the upwardly bowed arched condition bridging the support members.

Where the arches are provided, the sheet preferably includes a plurality of longitudinally spaced transversely extending pockets, each for receiving a center portion of a respective one of the arch members.

Preferably for cooperation with conventional rails, each of the support members comprises a channel section having a base with two depending side walls for engaging over a respective one of the rails.

In one convenient arrangement, each of the support members comprises a longitudinally continuous sheet edge mounting member and a plurality of separate rail engaging pieces which can flex each relative to the next.

In one convenient arrangement for attaching the edge of the sheet, the edge mounting member comprises a channel and a strip insert portion within the channel which holds an edge strip of the sheet within the channel.

In order to maintain a constant winding diameter across the width of the reel, there is preferably provided an arrangement for matching the wound diameter of the sheet and support members on the reel at the support members and at the center of the sheet.

This can be achieved by the channel section of each support member having the depending side walls thereof collapsible to the base for matching the wound diameter of the sheet and support members on the reel at the support members and at the center of the sheet.

Preferably for flexibility as the support members move inwardly and outwardly to accommodate the change in width from the rolled to the deployed position, the separate rail engaging pieces have curved front and rear edges.

According to a second aspect of the invention there is provided an apparatus for composting waste materials comprising:

an elongate pit for receiving waste material to be composted arranged such that the material can be loaded into the pit for composting and removed from the pit when composting is complete;

two rails each arranged along a respective side of the opening;

a fabric sheet having a length to cover at least a part of the length of the opening and a width between two side edges to span the width between the rails;

each side edge of the sheet having therealong a respective support member arranged for engaging the respective rail so as to attach the side edge to the rail;

a carriage movable along the opening;

and a reel mounted on the carriage and arranged to roll the sheet and the two support members onto the reel and to un-roll the sheet and the two support members therefrom;

such that the sheet member can be unrolled from the reel by movement of the carriage longitudinally along the opening in one direction for deployment over the opening and can be rolled onto the reel by movement of the carriage longitudinally along the opening in an opposed direction for exposing the opening.

This arrangement is particularly useful where there is provided a machine for acting on the material in the pit during composting, the machine being arranged to run along the rails behind the carriage as the cover sheet is removed and rolled onto the reel and wherein there is provided a second fabric sheet on a second carriage arranged to follow the machine and deploy the second fabric sheet over the pit as the machine moves along the pit.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 3:
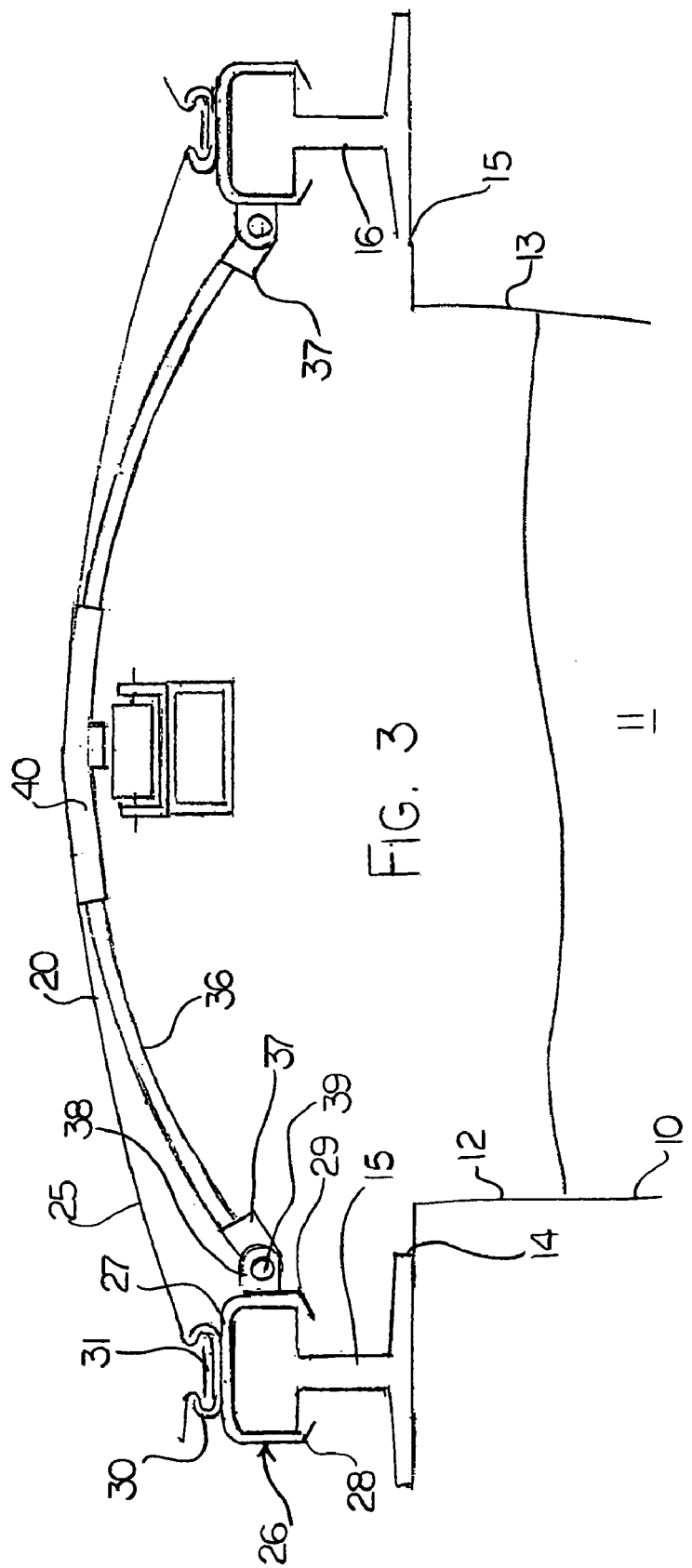
FIG. 3 is a cross sectional view through the pit and cover mounted on the rails and showing the center guide of the carriage as the carriage moves along the rail leaving the cover in place.
Figure 10:
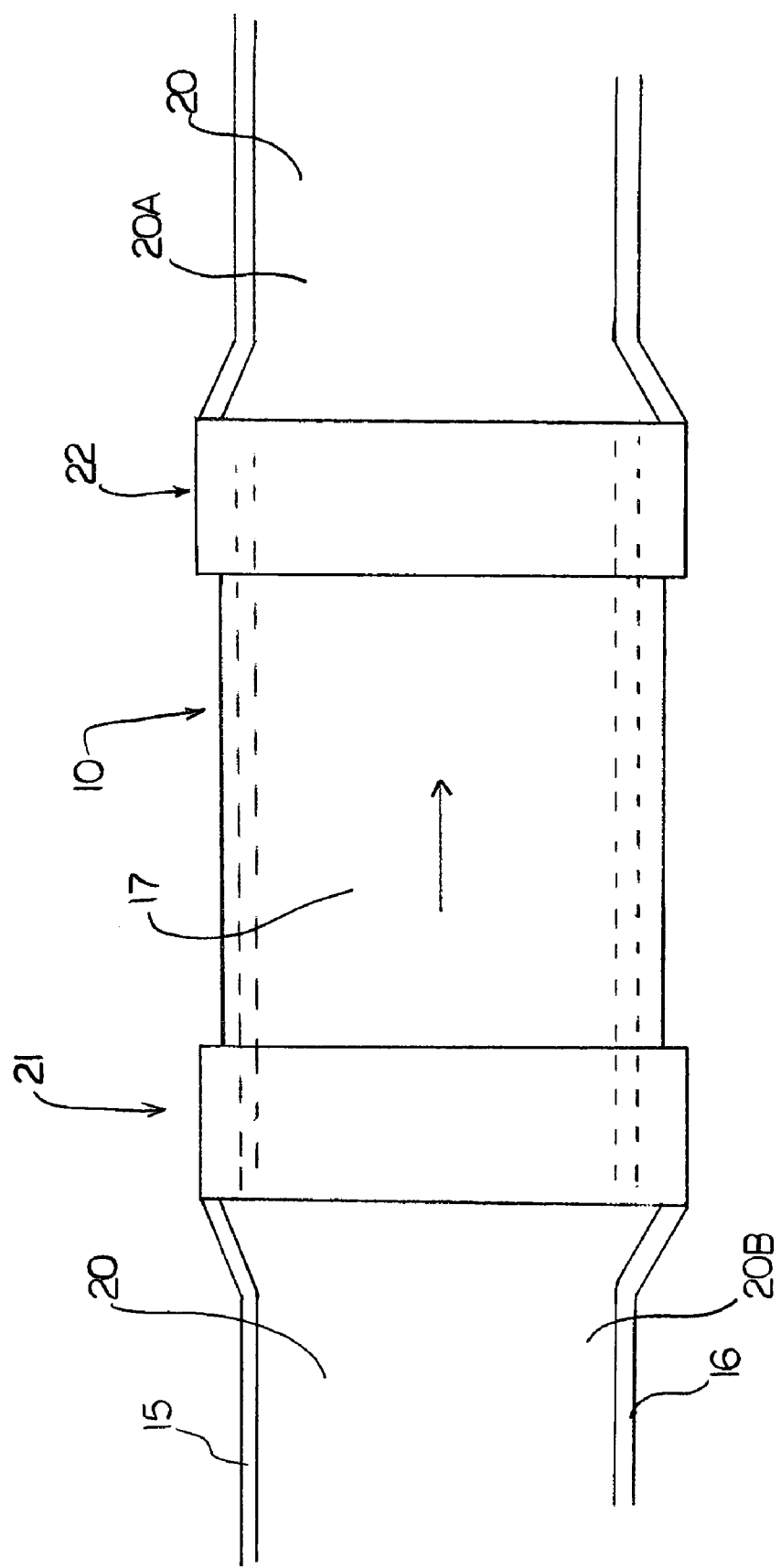
FIG. 10 is a top plan view of a portion of a pit with a machine operating on the materials within the pit for maintaining the pit covered on each side of the machine.

In FIGS. 3 and 10 is shown a pit 10 containing material 11 arranged to be composted within the pit. The pit has pit walls 12 and 13 which depend downwardly from a top surface 14, 15 at the side of the pit on which is mounted a guide rail 15, 16 each on a respective side of the pit. On the guide rails 15 and 16 is carried a machine 17 which acts on the material within the pit for agitation, watering and any other actions required for the composting process.

The pit is covered by a cover sheet 20 which bridges the pit and is attached to the rails 15 and 16. In FIG. 10 the vehicle is attached to and transports a first carriage 21 and a second carriage 22 with one in front of the vehicle and one behind the vehicle. Each of the carriages carries a reel of the cover 20 so that the carriage in front of the vehicle rolls up a portion 20A of the cover 20 onto the reel so that cover is removed as the vehicle moves forwardly. The carriage 21 acts to unroll a portion 20B of the cover 20 so that the portion 20B is applied back onto the pit as the vehicle moves forwardly. In this way only the area immediately adjacent the vehicle is exposed during the action of the machine on the material within the pit thus maintaining the pit substantially closed during operation and at all further times so as to maintain the gases within the pit for careful control and management of the composting action. Keeping the pit closed allows the temperature and gas content to be properly managed thus improving the operation of the composting system.

The cover shown in FIG. 3 thus comprises a sheet 25 of a suitable impermeable sheet material. At each rail 15, 16 is provided a support member 26 in the form of a channel which engages over the rail with a base 27 and two depending side legs 28 and 29 which clip onto the rail and thus hold the channel 26 in place on the rail in fixed position. On top of the base of the channel is provided a receptacle for the edge of the sheet 25 in the form of a channel portion 30 which receives a strip insert 31 pushed into the interior of the channel so as to trap an edge strip of the sheet 25 within the channel 30 and hold the edge strip in fixed position. An arrangement of this type is disclosed in detail in prior US Patents by one of the present inventors and has been widely used and commercially successful for a number of years. This arrangement thus holds the edge of the sheet in place and maintains the seal between the channel 30 and the sheet.

Figure 9:
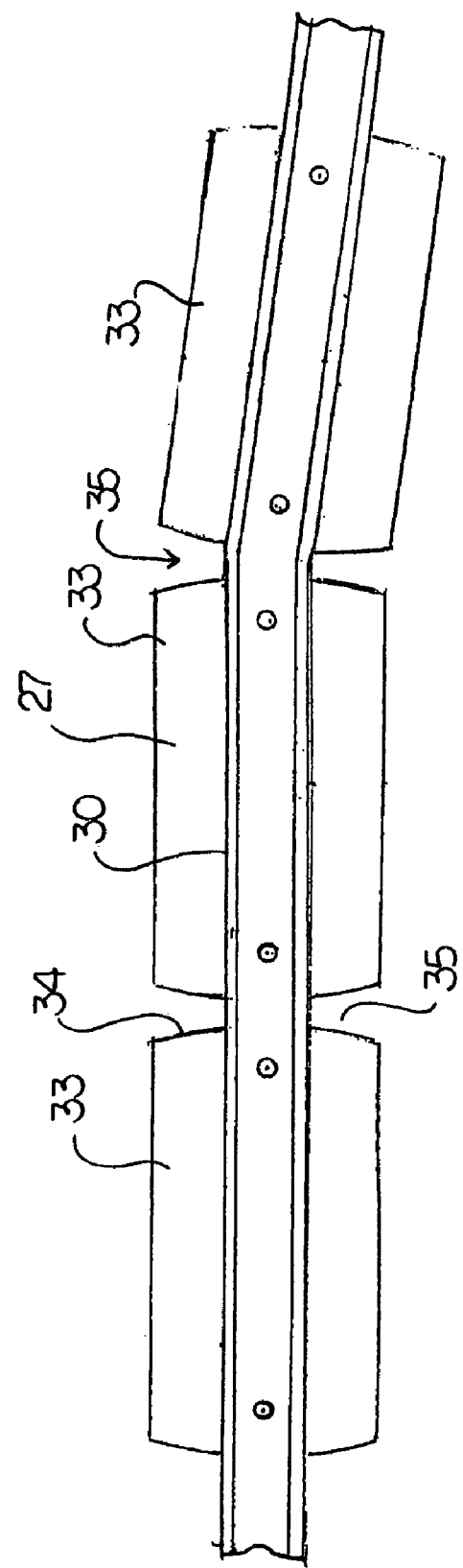
FIG. 9 is a top plan view of a modified arrangement of the support member of FIG. 3.

In FIG. 9, a top plan view of each of the support members 26 is shown and this includes the continuous channel 30 which is fastened to a plurality of inverted channel portions 33 which define the base 27 and the legs 28 and 29. The channel portions 33 have end edges 34 which lie at right angles to the length of the channel 30 which are smoothly curved so as to allow flexibility of the structure about a narrow space 35 between the curved end edges 34. Thus as indicated at 35, the channel 30 can flex while one portion 33 tilts about a vertical pivot axis relative to the next portion 33 thus allowing the support member to bend as described hereinafter.

Arch shaped braces 36 are provided at spaced positions along the length of the cover. Each of the arch shaped braces 36 is formed of a metal strip which can flex. The metal strip is received within a receptacle 37 attached to a respective one of the support members 26. The receptacle 37 is attached to a lug 38 for pivotal movement about a pin 39 so that the receptacle can move to a flat position lying in a common plane with the two support members 26 when the strip 36 is flat and therefore no longer arched. A pocket 40 is attached to the underside of the sheet 25 at the center section to receive the center part of the strip 36 to hold it in place and located relative to the sheet 25. Thus in a deployed position shown in FIG. 3, the receptacle 37 is pivoted slightly upwardly and receives the end of the strip 36 which is thus inclined upwardly and inwardly toward the center of the sheet so as to form an arch which acts to support the sheet bridged between the two support members and raised above the material 11. In this position the structure is stable and holds the cover sheet in place as a sealed member engaged onto the rail with the cover properly supported at spaced positions along its length by the arch shaped strips 36.

Figure 1:
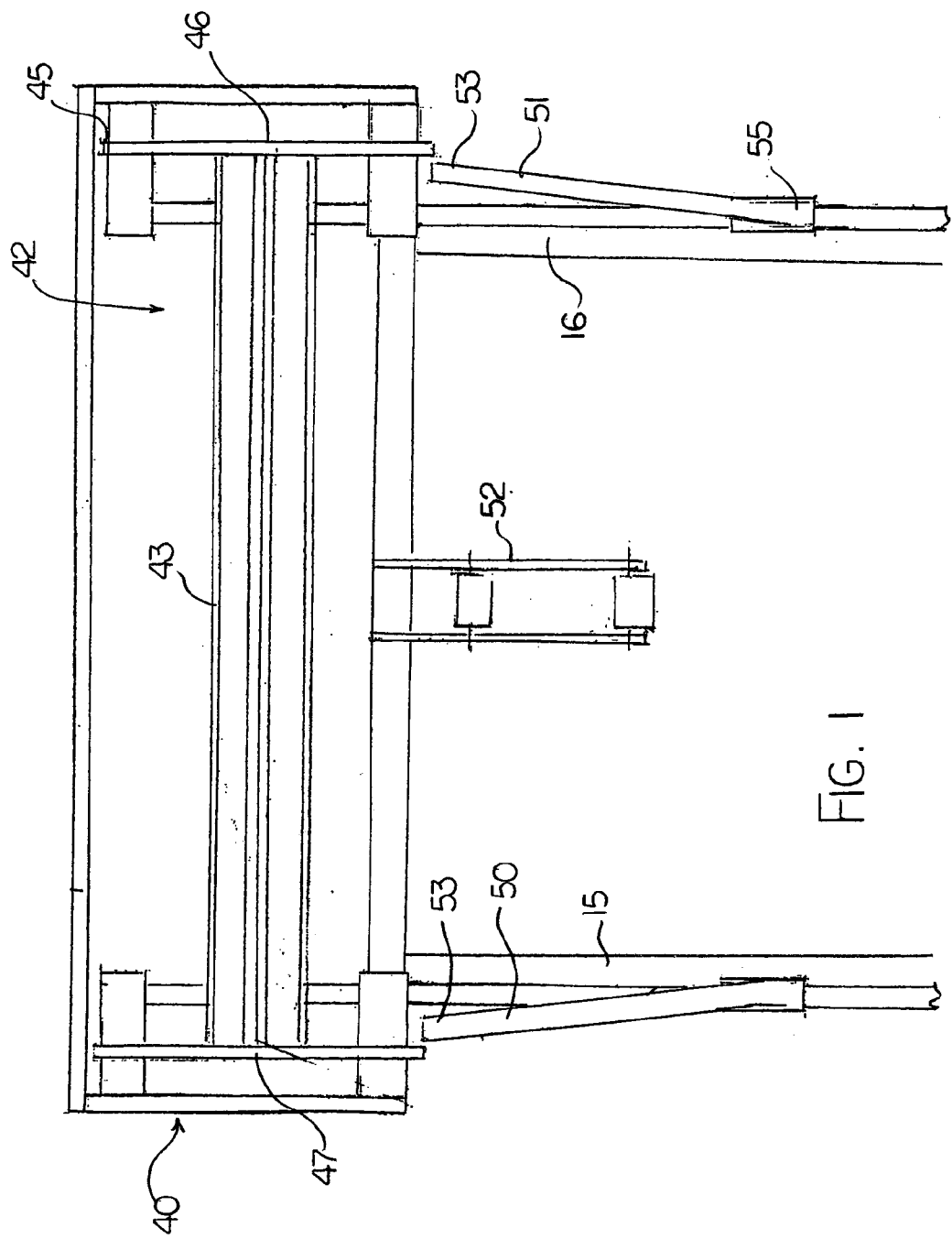
FIG. 1 is a top plan view of a pit with a carriage thereon for carrying the cover, the cover being omitted for convenience of illustration.
Figure 2:
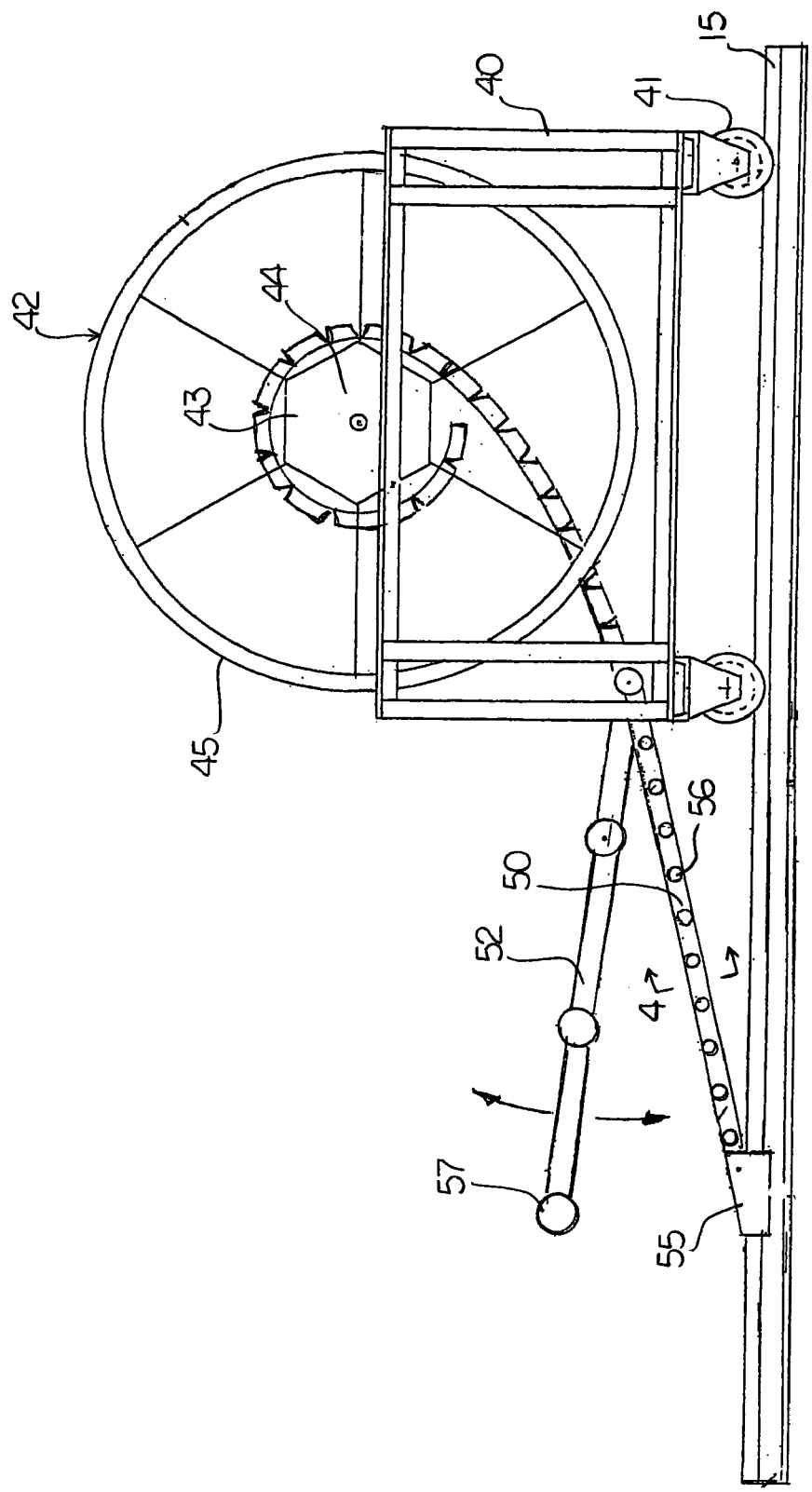
FIG. 2 is a side elevational view of the rails and carriage of FIG. 1.

Turning now to FIGS. 1 and 2, the carriage for deploying the cover onto the pit comprises a frame 40 mounted on wheels 41 mounted on the rails 15, 16. The frame is a generally rectangular frame supporting a cylindrical reel 42 above the rails between the wheels at a front and rear of the frame 40. The reel includes a hub 43 mounted on bearings 44 so that the reel can be rotated either manually or by a driven motor (not shown). The reel is arranged to roll the cover with the support members attached thereto onto the reel as a spiral winding around the hub 43. The diameter of the reel is selected relative to the length of the cover so that the reel can receive the complete length of the cover within an outer diameter of the reel defined by a peripheral ring 45.

The reel as shown in FIG. 1 has a length between its ends 46 and 47 which is greater than the spacing between the rails 15 and 16. In this way the reel has a length sufficient to take up the full width of the sheet 25 with the support members thereon when the sheet is moved to the flat condition by releasing the bow in the arch shaped strips so that the strips move to a flat condition thus holding the sheet flat in a common plane with the side support members.

Figure 4:
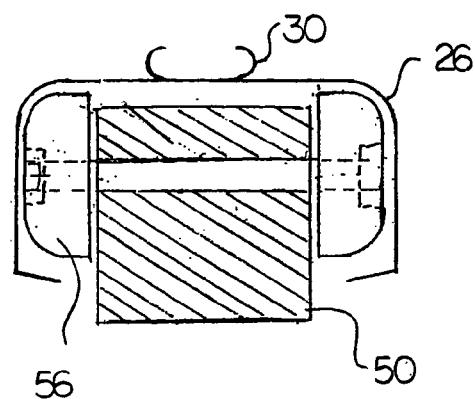
FIG. 4 is a cross sectional view along the lines 4—4 of FIG. 2 showing the guide arm for guiding the sheet support member onto the rail track.
Figure 5:
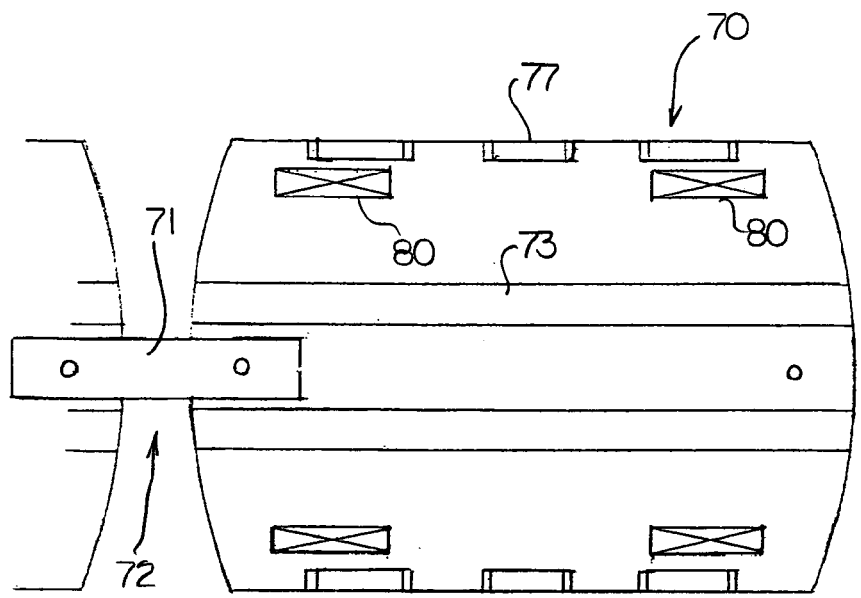
FIG. 5 is a top plan view of a portion of the support for engaging over the rail.
Figure 6:
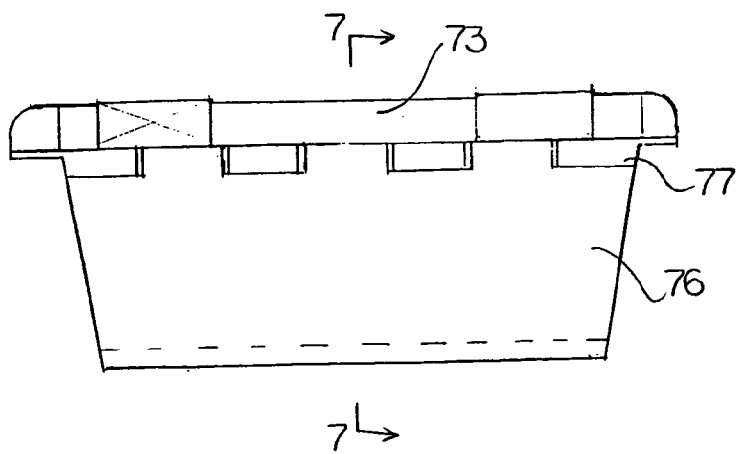
FIG. 6 is a side elevational view of the portion of the support member.

When the cover including the side support members is rolled onto the hub 43 of the reel 42, it can be fed into engagement with the track by guides 50, 51 and 52. Guides 50 and 51 are arranged at the ends 46 and 47 of the reel and are carried on the frame 40 so as to extend from an inner end 53 at the frame downwardly toward the respective rail and inwardly from the respective end of the reel to the inner position of the respective rail. Thus as shown in FIG. 1 the guides 50 and 51 are inclined slightly inwardly from the outer ends of the reel where the side support members are rolled inwardly to a position directly aligned with the respective rail. At the outer end of the respective guide 50, 51 is provided a guide shoe 55 which runs on the rail and over which the side support member runs. The arm 50 as shown in FIG. 4 has a plurality of rollers 56 at spaced positions along its length arranged in pairs. The rollers 56 are thus on respective sides of the arm 50 and act to roll against the inside surface of the channel 26 so as to carry the channel forming the side support member over the arm from the reel to the rail.

It will be appreciated that this movement in the inclined direction of the arms 50 and 51 requires the side support members to flex as previously described.

The guide 52 comprises a further arm which is attached to the frame 30 at a position centrally of the reel and raised upwardly from the rails. The arm from the guide 52 includes a plurality of rollers 57 at spaced positions along the arm. As shown in FIG. 2, therefore, the arm forming the guide 52 is raised up above the arms 50 and 51 thus acting to divert the center of the sheet upwardly. It will be appreciated that the inward movement of the side support members of the sheet causes the spacing between them to be decreased thus acting to bow the strip 36 into an arch. It is however necessary to ensure that the arch is formed upwardly rather than downwardly and thus the arches and the center portion of the sheet are diverted upwardly over the arm 52.

Figure 7:
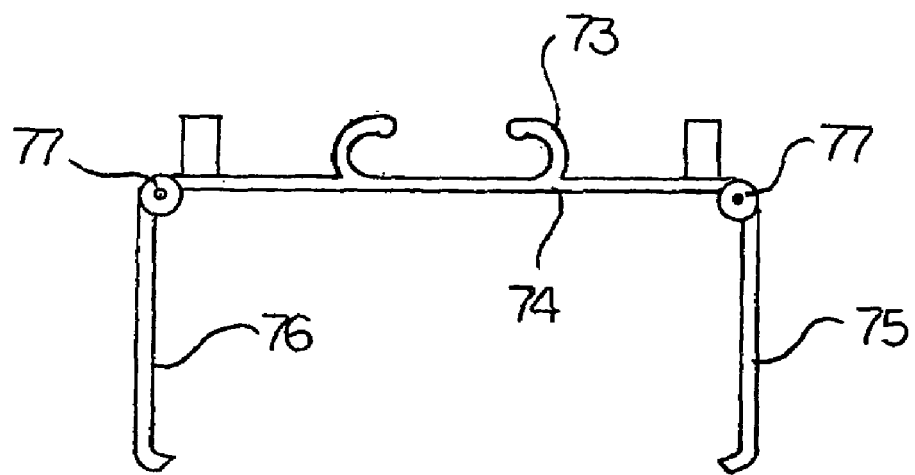
FIG. 7 is a cross sectional view along the lines 7—7 of FIG. 6.
Figure 8:
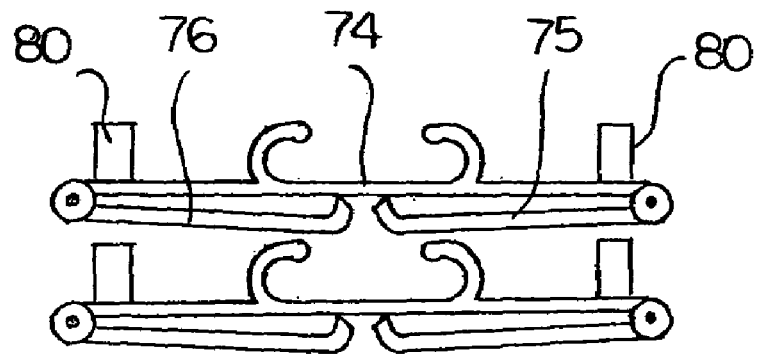
FIG. 8 is a cross sectional view similar to that of FIG. 7 showing the portions of the support member in a folded position wound onto the reel wound into a helical construction surrounding the reel.

Turning now to FIGS. 5, 6, 7 and 8, there is shown an alternative arrangement for the side support members of the sheet. In this embodiment the side support members are formed from individual components indicated at 70 which are connected together by straps 71 leaving a narrow space 72 allowing the flexibility previously mentioned. In this embodiment the channel for locking the edge of the sheet indicated at 73 is formed integrally with the base 74 of the channel. In this embodiment the side walls 75 and 76 of the channel are hinged at 77 to the base 74 allowing them to be folded substantially flat as shown in FIG. 8. The base and channel can be injection molded as a single piece with the side walls being injection molded and snapped into place using hinges connecting the pieces together.

In the installed position of the cover shown in FIG. 7 the depending side walls 75 and 76 are moved to the right angle position for engaging the side of the rails. In FIG. 8 is shown the collapsed condition where the side support members defined by the channel are moved into a collapsed condition in which the side walls 75 and 76 are folded flat underneath the base 74. This therefore reduces the height of the side support members so that each can be stacked on top of the next with a height which is not significantly greater than the height of the transverse bars 36. In this way the diameter of the reel can be reduced and the diameter of the reel is substantially constant across the width of the reel. Thus the collapsible channel members avoids a situation where the diameter of the reel at the channels increases much greater rate than the diameter at the center which can cause rolling problems.

Alternative techniques can be provided for maintaining a substantially constant diameter along the length of the rolled cover for example by providing spacers at the center which support the center part of the cover and hold it at a diameter substantially matching that of the rolled support members.

In order to provide effective stacking of one support member on the next, each support member has a plurality of upstanding studs 80 at spaced positions over the top surface of the base 74.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus comprising:
   an elongate opening having two rails each arranged along a respective side of the opening,
   a fabric sheet having a length to cover at least a part of the length of the opening and a width between two side edges to span the width between the rails;
   each side edge of the sheet having therealong a respective support member arranged for engaging the respective rail so as to attach the side edge to the rail;
   a carriage movable along the opening;

and a reel mounted on the carriage and arranged to roll the sheet and the two support members onto the reel and to un-roll the sheet and the two support members therefrom;

such that the sheet member can be unrolled from the reel by movement of the carriage longitudinally along the opening in one direction for deployment over the opening and can be rolled onto the reel by movement of the carriage longitudinally along the opening in an opposed direction for exposing the opening;

wherein the sheet is wider than the rails;

wherein the carriage has guides for deploying the sheet;

and wherein the guides are arranged to direct the support members from a wider position maintaining the sheet flat on the reel inwardly to the width of the rails as the sheet is deployed.

2. The apparatus according to claim 1 wherein the carriage has wheels which are arranged to roll on the rails.

3. The apparatus according to claim 1 wherein each of the support members comprises a longitudinally continuous sheet edge mounting member and a plurality of separate rail engaging pieces which can flex each relative to the next.

4. The apparatus according to claim 3 wherein the edge mounting member comprises a channel and a strip insert portion within the channel which holds an edge strip of the sheet within the channel.

5. The apparatus according to claim 1 wherein there is provided an arrangement for matching the wound diameter of the sheet and support members on the reel at the support members and at the center of the sheet.

6. The apparatus according to claim 3 wherein the separate rail engaging pieces have curved front and rear edges.

7. Apparatus comprising:

an elongate opening having two rails each arranged along a respective side of the opening;

a fabric sheet having a length to cover at least a part of the length of the opening and a width between two side edges to span the width between the rails;

each side edge of the sheet having therealong a respective support member arranged for engaging the respective rail so as to attach the side edge to the rail;

a carriage movable along the opening;

and a reel mounted on the carriage and arranged to roll the sheet and the two support members onto the reel and to un-roll the sheet and the two support members therefrom;

such that the sheet member can be unrolled from the reel by movement of the carriage longitudinally along the opening in one direction for deployment over the opening and can be rolled onto the reel by movement of the carriage longitudinally along the opening in an opposed direction for exposing the opening;

wherein there is provided a plurality of longitudinally spaced supports each bridging between the support members for supporting the sheet between the support members;

wherein each support has each end thereof attached to a respective one of the support members;

and wherein each support is flexible so as to move from a flat condition on the reel to an arched position between the support members when the support members are engaged onto the rails.

8. The apparatus according to claim 7 wherein the carriage has a guide member thereon located between the support members for lifting the supports from the flat condition as each is deployed to the upwardly bowed arched condition bridging the support members when the support members are engaged onto the rails.

9. The apparatus according to claim 7 wherein the sheet includes a plurality of longitudinally spaced transversely extending pockets, each for receiving a center portion of a respective one of the supports.

10. Apparatus comprising:

an elongate opening having two rails each arranged along a respective side of the opening;

a fabric sheet having a length to cover at least a part of the length of the opening and a width between two side edges to span the width between the rails;

each side edge of the sheet having therealong a respective support member arranged for engaging the respective rail so as to attach the side edge to the rails;

a carriage movable along the opening;

and a reel mounted on the carriage and arranged to roll the sheet and the two support members onto the reel and to un-roll the sheet and the two support members therefrom;

such that the sheet member can be unrolled from the reel by movement of the carriage longitudinally along the opening in one direction for deployment over the opening and can be rolled onto the reel by movement of the carriage longitudinally along the opening in an opposed direction for exposing the opening;

wherein each of the support members comprises a channel section having a base with two depending side walls for engaging over a respective one of the rails.

11. The apparatus according to claim 10 wherein the channel section of each support member has the depending side walls thereof collapsible to the base for matching the wound diameter of the sheet and support members on the reel at the support members and at the center of the sheet.

12. Apparatus for composing waste materials comprising:

an elongate pit for receiving waste material to be composted arranged such that the material can be loaded into the pit for composting and removed from the pit when composting is complete;

two rails each arranged along a respective side of the opening;

a fabric sheet having a length to cover at least a part of the length of the opening and a width between two side edges to span the width between the rails;

each side edge of the sheet having therealong a respective support member arranged for engaging the respective rail so as to attach the side edge to the rail;

a carriage movable along the opening;

and a reel mounted on the carriage and arranged to roll the sheet and the two support members onto the reel and to un-roll the sheet and the two support members therefrom;

such that the sheet member can be unrolled from the reel by movement of the carriage longitudinally along the opening in one direction for deployment over the opening and can be rolled onto the reel by movement of the carriage longitudinally alone the opening in an opposed direction for exposing the opening;

wherein there is provided a machine for acting on the material in the pit during composting, the machine being arranged to run along the rails behind the carriage as the cover sheet is removed and rolled onto the reel;

and wherein there is provided a second fabric sheet on a second carriage arranged to follow the machine and deploy the second fabric sheet over the pit as the machine moves along the pit.

13. The apparatus according to claim 12 wherein there is provided a plurality of longitudinally spaced supports each bridging between the support members for supporting the sheet between the support members, wherein each support has each end thereof attached to a respective one of the support members; and wherein each support is flexible so as to move from a flat condition on the reel to an arched position between the support members when the support members are engaged onto the rails.

14. The apparatus according to claim 12 wherein the sheet is wider than the rails, wherein the carriage has guides for deploying the sheet, and wherein the guides are arranged to direct the support members from a wider position maintaining the sheet flat on the reel inwardly to the width of the rails as the sheet is deployed.

15. The apparatus according to claim 12 wherein each of the support members comprises a channel section having a base with two depending side walls for engaging over a respective one of the rails.

* * * * *